United States Patent [19]

Chen et al.

[11] Patent Number: 5,249,200
[45] Date of Patent: Sep. 28, 1993

[54] DEVICE AND METHOD FOR COMBINING PRECODING WITH SYMBOL-RATE SPECTRAL SHAPING

[75] Inventors: Michael Chen; M. Vedat Eyuboglu, both of Boston, Mass.

[73] Assignee: Codex Corporation, Mansfield, Mass.

[21] Appl. No.: 737,874

[22] Filed: Jul. 30, 1991

[51] Int. Cl.⁵ .......................................... H04B 15/00
[52] U.S. Cl. ....................................... 375/58; 375/60; 375/99; 329/349; 332/159
[58] Field of Search ................. 375/18, 37, 39, 57, 375/58, 11; 374/43, 45; 332/159, 107; 329/349; 455/50

[56] References Cited

U.S. PATENT DOCUMENTS

| 4,631,735 | 12/1986 | Quereshi | 375/39 X |
|---|---|---|---|
| 4,713,829 | 12/1987 | Kyuboglu | 375/37 X |
| 5,093,843 | 3/1992 | Hirosaki et al. | 375/18 |

OTHER PUBLICATIONS

"Linear Receivers for correlatively coded MSK" by Galko et al., IEEE Transactions on Communication vol. COM-33 No. 4 Apr. 1985.

"Channel Coding with Multilevel/Phase Signals", by Gottfried Underboack, IEEE Transactions on Information Theory, vol. IT-28, No. 1, Jan. 1982.

"Coset Codes—Part I: Introduction and Geometrical Classification", by G. David Fomey, Jr., IEEE Transaction on Information Theory, vol. 34, No. 5, Sep. 1988.

"Detection of Coded Modulation Signals on Linear, Severely Distored Channels Using Decision—Feedback Noise Prediction with Interleaving," by M. Vedat Eyuboglu, IEEE Transactions on Communications, vol. 36, No. 4, Apr. 1988.

"Reduced-State Sequency Estimation for Coded Modulation on Intersymbol Interference Channels", by M. Vedat Eyuboglu and Shahid U. H. Qureshi, IEEE Journal on Selected Areas in Communications, vol. 7, No. 6, Aug. 1989.

"Coset Codes for Partial Response Channels; or, Coset Codes with Spectral Nulls", by G. David Fomey, Jr., and A. R. Caldenbank, IEEE Transactions on Information Theory, vol. 35, No. 5, Sep. 1989.

"New Automatic Equaliser Employing Modulo Arithmetic", M. Tomlinson, Electronics Letters, vol. 7, Nos. 5/6, Mar. 25, 1971.

"Baseband Line Codes Via Spectral Factorization", by A. R. Caldenbank and J. E. Mazo, IEEE Journal on Selected Areas in Communications, vol. 7, No. 6, Aug. 1989.

"Matched-Transmission Technique for Channels With Intersymbol Interference", by Hiroshi Harashima and Hiroshi Miyakawa, IEEE Transactions on Communications, vol. Com-20, No. 4, Aug. 1972.

*Primary Examiner*—Curtis Kuntz
*Assistant Examiner*—Tesfaldet Bocure
*Attorney, Agent, or Firm*—Darleen J. Stockley

[57] ABSTRACT

The device and method provide precoding and symbol-rate transmitter spectral shaping of signals representative of digital information. The invention improves reliability of reception in the presence of non-Gaussian channel noise. The present invention also provides a flexible way of choosing between linear equalization, precoding without spectral shaping, and precoding with spectral shaping.

22 Claims, 5 Drawing Sheets

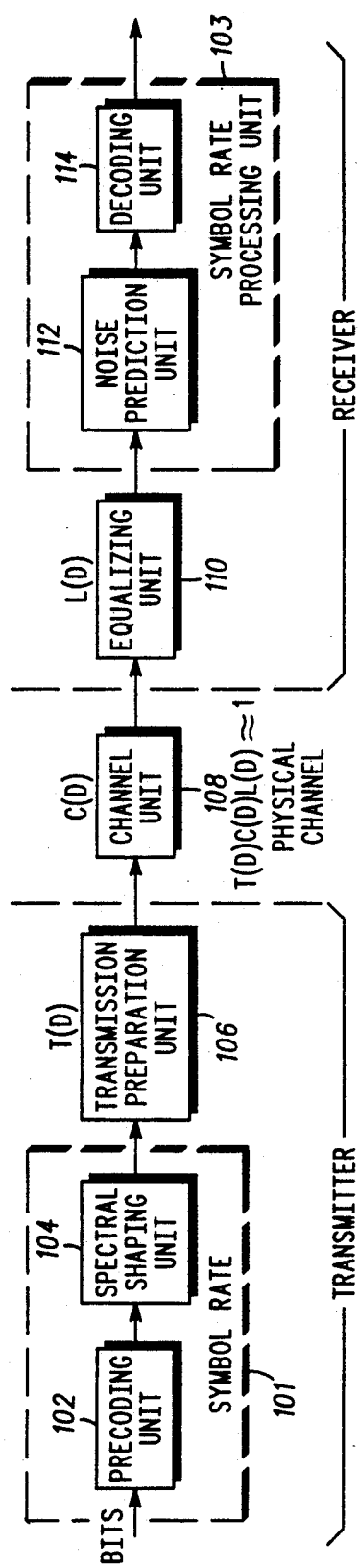

600

800

5,249,200

DEVICE AND METHOD FOR COMBINING PRECODING WITH SYMBOL-RATE SPECTRAL SHAPING

FIELD OF THE INVENTION

This invention relates to systems that communicate signals representative of digital information, and more particularly to systems that spectrally shape said communicated signals.

BACKGROUND OF THE INVENTION

In a typical data transmission system, a physical channel may be effectively modeled by utilizing filtration at the transmitter, channel filtration, an additive white Gaussian noise source, and receiver filtration. Certain methods have been developed for reliably transmitting digital information over linear distorting channels using linear modulation methods such as quadrature amplitude modulation (QAM) and phase shift keying (PSK). Powerful coded modulation methods have been utilized in a sufficiently high signal to noise ratio (SNR) environment to allow approaching a capacity of a Gaussian channel with intersymbol interference (ISI) if the system can attain ideal decision feedback equalizer (DFE) performance followed by Maximum Likelihood decoding. However realization of DFE in a coded system poses problems in obtaining reliable decision feedback, and hence, enhances severity of error propagation.

In the early 1970's Tomlinson modulo-precoding was introduced as a means to avoid error propagation in DFE for pulse amplitude modulation (PAM) systems by implementing a feedback filter of a DFE in a transmitter where a transmit symbol is utilized for feedback filtration. This method completely precompensates for postcursor ISI without increasing a transmitted power where moderate to high transmission rates are used. Modulo arithmetic is used to bound a dynamics range and to recover power loss implied by the filtration. More recently, the concept of precoding has been generalized to coded systems on partial response channels, onto higher dimensional signal sets such as QAM, and has been combined with trellis shaping to achieve substantial shape gain without reducing coding gain.

A precoding system may be realized using a noise predictive form of DFE together with a training procedure. Under moderate to high rate of operation, spectral properties of a precoded sequence remain statistically white, preserving characteristics of an input scrambled sequence to the precoding process.

In certain types of channel there is a need for a transmitted sequence to achieve certain spectral properties. For example, when a severe nonlinear distortion source is present in an output signal of a channel filtration, it may be desirable to include pre-emphasis filtration on the transmitted sequence such that a peak-to-average ratio of the channel output signal is reduced. However, typically pre-emphasis filtration as a component of linear equalization geared pre-emphasis spectrally shaping the transmit sequence imposes a power penalty on a transmit power-limited system, that penalty being independent of any previous coding, shaping and/or equalization method utilized in the transmission system. Higher than symbol-rate filtering is a convenient filtering rate for conventional transmit filters. However, at the present time, symbol-rate spectral shaping independent of the higher than symbol rate transmit filter is not available.

Thus, there is a need for a device and method that provide at least a substantially symbol-rate transmitter spectral shaping of signals representative of digital information that is independent of the higher than symbol-rate transmit filter.

SUMMARY OF THE INVENTION

A device and method of the present invention provide at least a substantially symbol-rate transmitter spectral shaping of signals representative of digital information, the digital information being represented by at least an initial symbol sequence, comprising at least one of: a modulation unit for at least modulating information; and a demodulation unit for at least demodulating information; wherein: the modulation unit comprises at least: a precoding unit, where desired, operably coupled to the digital information input, for substantially precoding the at least initial symbol sequence utilizing a predetermined equivalent channel response; a spectral shaping unit, operably coupled to one of: the digital information input and the precoding unit, for substantially utilizing a spectral shaping filtering function and a first scaling factor to provide a spectrally shaped sequence, the spectral filtering function also being provided, where desired, to the precoding unit; a transmission preparation unit, where desired, operably coupled to the spectral shaping unit, for providing at least one of: preselected filtering and preselected equalization, to obtain a spectrally shaped transmission sequence for transmission on a selected channel of a channel unit; and the demodulation unit comprises at least: an equalizing unit, where desired, operably coupled to the channel unit, for receiving and equalizing one of the spectrally shaped sequence and the spectrally shaped transmission sequence, and a symbol-rate processing unit, operably coupled to one of the equalizing unit and the channel unit, for receiving one of the spectrally shaped sequence and the spectrally shaped transmission sequence, equalized where desired, substantially determining a noise prediction filtering function, and utilizing that noise prediction filtering function and at least a second scaling factor to provide at least a first symbol sequence for a symbol-rate spectrally shaped signal, the noise prediction filtering function also being provided, where desired, to the precoding unit.

BRIEF DESCRIPTION OF THE DRAWINGS

FIG. 1 is a block diagram of a first embodiment of a device in accordance with the present invention.

FIGS. 2A, 2B, and 2C are block diagrams further illustrating exemplary block diagram embodiments of the precoding unit, spectral shaping unit, and symbol-rate processing unit block diagrams, respectively, of the first embodiment of the device in accordance with the present invention.

DETAILED DESCRIPTION OF A PREFERRED EMBODIMENT

Figure 3:
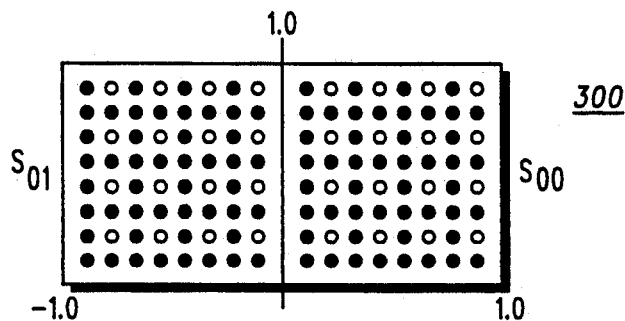
FIG. 3 is an exemplary representation of a 128 point signal constellation S that consists of two 64-point constellations $S_{00}$ and $S_{01}$ in quadrants 1 and 2, respectively, utilized in an embodiment of the present invention.

The device and method of the present invention provide for at least substantially precoding and symbol-rate transmitter spectral shaping of signals representative of digital information in addition to providing flexibility in selection of operational modem modes and to improve received signals in the presence of non-ideal channel noise. The flexibility of the present invention allows selection of desired equalization, typically linear, precoding without spectral shaping, and precoding with spectral shaping.

FIG. 1, numeral 100, is a block diagram of a first embodiment of a device in accordance with the present invention. The device provides for at least a substantially symbol-rate transmitter spectral shaping of signals representative of digital information, where the digital information is typically represented by at least an initial symbol sequence, and comprises at least one of: a modulation unit for at least modulating information; and a demodulation unit for at least demodulating information; wherein: the modulation unit comprises at least: a precoding unit (102), where desired, operably coupled to the digital information input, for substantially precoding the at least initial symbol sequence utilizing a predetermined equivalent channel response; a spectral shaping unit (104), operably coupled to one of: the digital information input and the precoding unit (102), for substantially utilizing a spectral shaping filtering function and a first scaling factor to provide a spectrally shaped sequence, the spectral filtering function also being provided, where desired, to the precoding unit (102); a transmission preparation unit (106), where desired, operably coupled to the spectral shaping unit (104), for providing at least one of: preselected filtering and preselected equalization, to obtain a spectrally shaped transmission sequence for transmission on a selected channel of a channel unit (108); and the demodulation unit comprises at least: an equalizing unit (110), where desired, operably coupled to the channel unit (108), for receiving and equalizing one of the spectrally shaped sequence and the spectrally shaped transmission sequence, and a symbol-rate processing unit (103), operably coupled to one of the equalizing unit (110) and the channel unit (108), for receiving one of the spectrally shaped sequence and the spectrally shaped transmission sequence, equalized where desired, substantially determining a noise prediction filtering function, and utilizing that noise prediction filtering function and at least a second scaling factor to provide at least a first symbol sequence for a symbol-rate spectrally shaped signal, the noise prediction filtering function also being provided, where desired, to the precoding unit (102). One advantage of the present invention is allowance of substantially symbol-rate spectral shaping that is independent of a higher than symbol-rate transmit filter.

Training for determining coefficients utilized in spectral shaping is typically in accordance with training methods known in the art, for example, least-mean-square (LMS) and Least-Square acquisition of predictive coefficients. In one embodiment, for example, a combination of a matched filter and a mean-square-error (MSE) linear equalizer are implemented as a digital transversal equalizer that has a fractional tap-spacing of T/M, where T is a symbol interval and M is a predetermined value sufficiently large to avoid aliasing. A known training sequence is typically transmitted, and a desired adaptive training algorithm, for example, the LMS algorithm, is utilized to learn the equalizer. Then, an adaptive minimum MSE linear predictor is typically determined such that it has a tap-spacing of T and steady state coefficients that form a desired channel response h(D). After the desired length of training, h(D) information is transmitted back to the transmitter. Thus, once the equivalent channel response h(D) is determined, h(D) information is transmitted to the precoding unit (102) and, where desired, to the spectral shaping unit (104), depending on a selected mode of operation. For pure precoding, h(D) information is transmitted to the precoding unit (102). For pure pre-emphasis, an optimal coefficient is transmitted to the spectral shaping unit (104). For precoding with spectral shaping, h(D) information is transmitted to the precoding unit (102) and the spectral shaping unit (104) utilizes a(D), as described more fully below. As desired, an adaptive algorithm may also adjust linear equalizer coefficients to minimize variations in channel response, but the symbol-rate processing unit (103) is typically fixed. Where updating of the symbol-rate processing unit (103) is desired, such updating information is also transmitted to the transmitter for synchronization. Also, as is known in the art, a receiver may monitor values of symbol-rate processing coefficients and, where such coefficients vary more than a predetermined level, may initiate new training.

In a trellis precoding system information data input may be expressed typically in terms of shaping bits and coding bits, where the coding bits also include so-called scaling bits, bits that typically do not directly enter a convolutional coding device. For example, in FIG. 4, described more fully below, an 11 bits input into the encoding unit (402, 404, 404) are coding bits.

Coding is selectable and may utilize, for example, a 4D (four dimensional) 16-state Wei code, (See L.-F. Wei, "Trellis coded modulation with multi-dimensional constellations," I.E.E.E. Trans. Inform. Theory, Vol. IT-33, pp. 483–501, 1987) to transmit 19.2 kbits at 2954 symbols/sec, such that, for example, a total number of 7 coded bits per symbol, of which ½ bit per symbol represents a redundancy of coding, are transmitted. Other selected symbol rates may be used.

FIG. 3, numeral 300, illustrates a 128 point signal constellation S that consists of two 64-point constellations $S_{00}$ and $S_{01}$ in quadrants 1 and 2, respectively. S is partitioned into four subsets as indicated by different markings, and two coded bits determine a subset. Selection between $S_{00}$ and $S_{01}$ is accomplished by identifying a sign of a first coordinate in two's complement representation, i.e., selecting between a positive coordinate x and its complement x-1.

Figure 4:
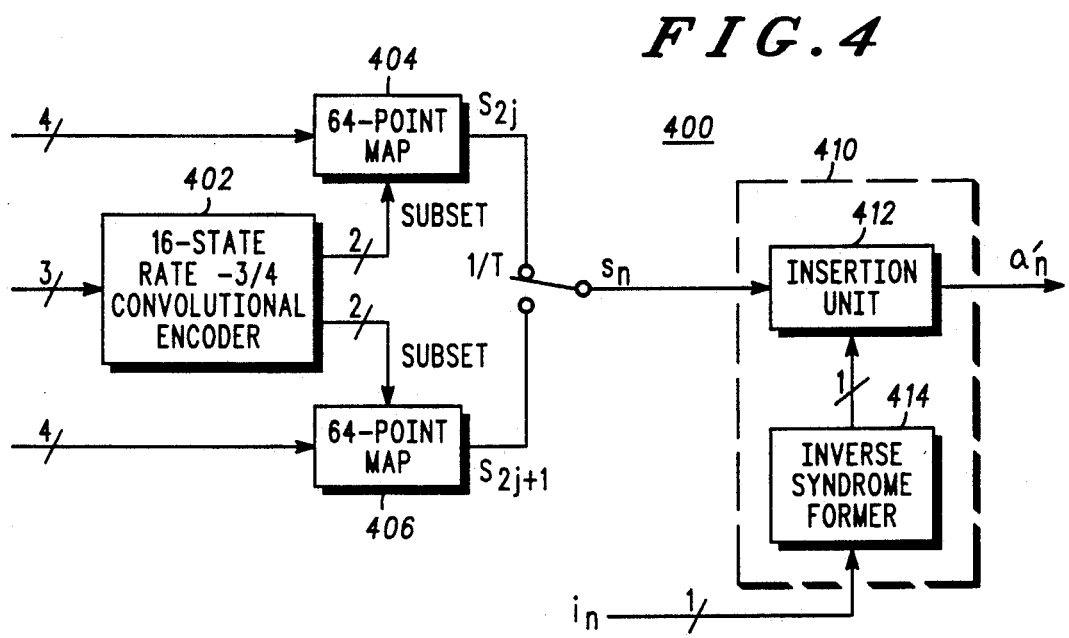
FIG. 4 illustrates an exemplary embodiment of a encoding unit together with an information shaping bit insertion unit for encoding in accordance with the present invention.

FIG. 4, numeral 400, depicts a block diagram of an exemplary generic 16-state, rate-¾, convolutional encoder (402) suitable for utilizing as a encoding unit for the present invention, configured such that two symbols from the 64 point mapping, $S_{00}$, are generated (at 404; at 406). Every two bauds, 3 information bits enter a rate-¾, 16-state trellis code whose 4 output bits select two subsets for two 2D (two dimensional) points in $S_{00}$. The 4 'uncoded' information bits select a first point $s_{2j}$, and another group of 4 'uncoded' information bits select a second point $s_{2j+1}$, both from the 64 point constellation $S_{00}$ and from the subsets chosen by the coded bits. Every baud, in the case of trellis precoding, a desired information shaping bit(s) is precoded, for example, in an inverse syndrome former (414). The information shaping bit(s), precoded where desired (for example, precoded as $t_{n,0}$), is combined by an insertion unit (412) with the coded sequence, $s_n$, to form a coded, shaped sequence. Thus, the information data encoding unit (402, 404, 406) is typically utilized for converting information into a selected number of bits to provide coded symbols. In one embodiment, trellis encoding, generally an efficient coding method, may be utilized. Where desired, more than one bit may be utilized in shaping.

Typically, an information shaping bit inserting unit (410), for an information shaping bit(s) input, performs a binary precoding, where desired, of the information shaping bit(s) in the inverse syndrome former (414) and utilizes an insertion unit (412) to combine the coded symbols with the information shaping bit(s), altered by shaping bit precoding where desired. When an embodiment in which precoding with a trellis code is utilized, the inverse syndrome former (414), typically a binary precoder, is utilized in the information shaping bit inserting unit (410). In one embodiment, for Tomlinson precoding, described further below, there is no shaping gain, allowing omission of the inverse syndrome former (414).

In a preferred embodiment, the precoding unit (102) is typically operated as a Tomlinson/generalized precoding unit, or alternatively, a trellis precoding unit. In Tomlinson precoding a transmitted sequence $x(D) = i(D) - c(D)$, where $x(D)$ is a discrete-time precoding unit response and $i(D)$ is typically an input sequence. For Tomlinson precoding, $c(D)$ corresponds typically to a member in a lattice $MZ^2$ where M is a scaling factor and $Z^2$ is a 2 dimensional integer lattice. Other lattices may be used. For trellis precoding, $c(D)$ corresponds to a sequence in a selected shaping trellis code T. It should be noted that the precoding unit (102) may be selected to receive coded, or alternatively, uncoded information bits as input. For a coded system, for example, where a 4-dimensional 16 state Wei code is utilized, typically a 16 state, rate-¾ convolutional encoder suitable for use in an encoding unit is then utilized.

Clearly, where a net transfer function of the precoding unit (102) is substantially one, the precoding unit (102) may be omitted. Also, in instances wherein no signal modification after spectral shaping is desired prior to transmission, the transmission preparation unit (106) may be omitted. The transmission preparation unit (106) typically implements at least a transmit filter at a higher rate than the symbol-rate to allow spectral shaping for excess bandwidth and the like. The spectral shaping unit (104) and the precoding unit (102) together substantially comprise a symbol-rate transmitter processing unit (101) that typically utilizes bits at the symbol-rate. The noise prediction unit (112) also typically utilizes the symbol-rate.

Utilization of the spectral shaping unit (102) in the present invention for at least one of symbol-rate spectral shaping and precompensation typically provides improvement over implementation of spectral shaping in the transmission preparation unit (106) since the transmission preparation unit (106) typically requires greater design intricacy, more computation complexity and operation at a higher rate.

Generally the channel unit (108) comprises at least a first physical channel, as is known in the art, having a channel unit response C(D). T(D), a transmission preparation unit response, and L(D), an equalizer unit response, are typically selected to provide a desired value for T(D)C(D)L(D). The equalizing unit L(D) that is installed to compensate for an effect of T(D) and C(D) is typically trained utilizing Minimum Mean Square Error criterion (MMSE). In an absence of noise, an MMSE solution to L(D) will be substantially 1/T(D)C(D). Hence, in that case, concatenation of T(D)C(D)L(D) is substantially unity. In the presence of noise, the L(D) will be trained so that the error or noise power at the output of L(D) is minimized. However, T(D)C(D)L(D) in the latter case may not be exactly unity. Since minimization of noise power by further processing of the L(D) output sequence is desired, such an MMSE solution is acceptable. L(D) is typically determined at a sampling rate that is higher than the symbol-rate. Thus, a sampling rate equalizer is typically utilized to compensate for the transmission preparation unit (106) and the channel unit (108). Compensation for a symbol-rate pre-emphasis filter is usually implemented in the symbol-rate processing unit (103). Hence, the symbol-rate transmitter processing unit (101) may be added after training without recomputation of a typical equalizer (110).

Also, the equalizing means (110) may be replaced by other known methods of channel transmission deficiency adjusters such as adaptive algorithm adjusters.

Utilizing D-transform symbol sequence notation, the precoding unit (102) system utilizes an equivalent linear discrete-time channel response, h(D), where $h(D) = \Sigma h_i D^i$, i=0, 1, 2, ... in a presence of white Gaussian noise. Without a loss of generality, $h_o$ is taken as one. An inverse of h(D) is always defined, and is denoted as $q(D) = 1/h(d) = 1 + q_1 D + q_2 D^2 + \ldots$ An output sequence of the precoding unit (102) is denoted x(D) and is generated according to $x(D) = [i(D) - c(D)]q(D)$, where c(D), in a case of general precoding, is a sequence with elements chosen from an integer lattice $MZ^2$, being modulo 2, to minimize an energy $|x(D)|^2$ of the output sequence. For trellis precoding, c(D) corresponds to a valid code sequence in a shaping trellis code C that attains energy minimization. It is clear that other integer lattices may be utilized for other selected modulo operations.

In the present invention, the equivalent channel response h(D) is represented by the combined response a(D)b(D), where a(D) typically represents a monic, minimum phase spectral shaping filter at a transmitter and b(D) typically denotes a monic, minimum-phase prediction filter in a receiver. g(D) is defined to be 1/a(D). Thus, h(D) is substantially b(D)/g(D). Thus h(D)=a(D)b(D) generally represents an equivalent channel response seen by the precoding unit (102) that is present in data sequence transmissions, but not in training transmissions. Thus, the transmitted sequence, x(D), is substantially:

$$x(D)=i(D)-x(D)[b(D)-1]+[i(D)-x(D)][g(D)-1]-c(D),$$

where i(D) is an input sequence. Typically, b(D) is an all zero FIR filter, and a(D) is an all pole filter. Thus, g(D) is typically an all zero filter.

FIG. 2A, numeral 200, further illustrates a block diagram of an exemplary embodiment of the precoding unit (102). In the exemplary embodiment, the precoding unit (102) utilizes one simple feedback system (for a modulo unit (206) having a transfer function mod) that utilizes a b(D)-1 transfer function unit (202), and one combined system comprising i(D) summed at a second summer (210) with the modulo unit (206) output, then implemented with a g(D)-1 transfer function unit (208). Upon input of an initial symbol sequence, i(D), the initial symbol sequence is input to a first summer (204) and is fed forward to the second summer (210). The first summer (204) sums i(D), an output from the simple feedback determination unit (for feedback from the modulo unit) wherein the transfer function b(D)-1 was utilized (202), and an output from the combined system that implemented a g(D)-1 transfer function unit (208). An output of the first summer (204) is input into the modulo unit (206), feedback is as described above, and x(D) is the output of the modulo unit (206).

FIG. 2B, numeral 225, further illustrates a block diagram of an exemplary embodiment of the spectral shaping unit (104). The precoding unit output sequence x(D) is passed through a symbol-rate spectral shaping filter (212) with response a(D) and is multiplied (214) by a first scaling factor, $1/\sqrt{A}$ (216) to generate transmit sequence x'(D), where $A=\Sigma|a_k|^2$ is defined as a power enhancement in the spectral shaping filter (212), where $a_k$ is a coefficient of the D transform a(D) in the expression h(D)=a(D)b(D). This scaling ensures that energy of x'(D) is equal to energy of x(D), thus complying with a transmit power limit constraint typical in a data transmission system. Determination of A is described more particularly below.

In one embodiment, wherein a discrete equivalent channel is utilized for the symbol-rate transmitter processing unit (101) and the symbol-rate processing unit (103), the transmission preparation unit (106) typically performs transmit filtering, digital to analog conversion filtering, and the like. As noted above, a non-discrete equivalent channel implementation may be utilized for the equalizing unit (110), the transmission preparation unit (106) and the channel unit (108).

Thus, as set forth in FIG. 2C, numeral 250, a block diagram illustrating an exemplary embodiment of the noise prediction unit, x'(D) is the input to the noise prediction unit (112) such that a noise prediction filter (218) having function b(D) provides an output that is multiplied by a scaling factor (222), $\sqrt{A}$, at a symbol-rate, to provide an output sequence. The output sequence is i(D)−c(D), and is decoded as is known. b(D) is selected to minimize noise power as seen at the input to a decoder, while a(D) is typically utilized to apply desired spectral shaping to a transmit sequence x'(D), or alternatively, as a pre-emphasis filter in linear equalization. Inclusion of an inverse of a(D) and b(D) in the precoding unit (102) operation ensures that the output sequence is y(D)=i(D)−c(D), and hence that i(D) is recoverable. It is clear that i(d) may be encoded or unencoded sequences.

Where the predetermined equivalent channel response is selected to be substantially one, and the spectral shaping filtering function is selected to be substantially an inverse of the noise prediction filtering function, an output sequence having suboptimal linear equalization with pre-emphasis shaping is achieved. Further, in the preceding case, where the noise prediction filtering function is also a first order function, substantially $b(D)=1+b_1z^{-1}$, a (D) can be formulated to obtain a closed form expression for filter coefficients.

Where the predetermined equivalent channel response is selected to be substantially equivalent to the noise prediction filtering function and the spectral shaping filtering function is selected to be substantially one, general precoding without spectral shaping is obtained.

Where the predetermined equivalent channel response is selected to be substantially a product of the spectral shaping filtering function and the noise prediction filtering function, and the spectral shaping filtering function is a selected shaping response, an output sequence having combined precoding with spectral shaping is obtained.

Where the spectral shaping filtering function and the noise prediction filtering function substantially equal one, the system reduces to a conventional PAM or QAM transmission, another case of suboptimal linear equalization.

Figure 5:
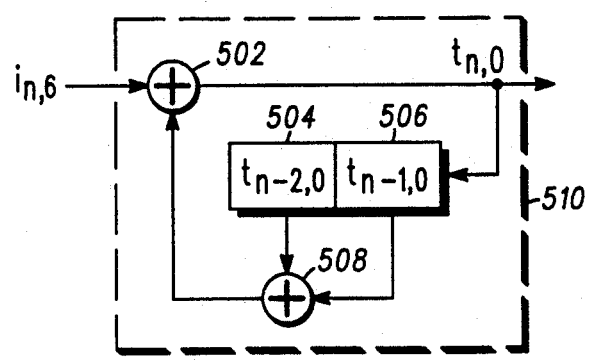
FIG. 5 illustrates an exemplary embodiment of an inverse syndrome former unit of a device with trellis precoding in accordance with the present invention.

FIG. 5, numeral 500, illustrates an exemplary embodiment of an inverse syndrome former unit (510) of a device in accordance with the present invention. This exemplary embodiment utilizes a first summer (502) to add input information shaping bit(s) to a sum of two immediately preceding successive input information shaping bit(s)(504, 506) obtained utilizing a second summer (508). Typically the summer is implemented with an exclusive OR.

Figure 6:
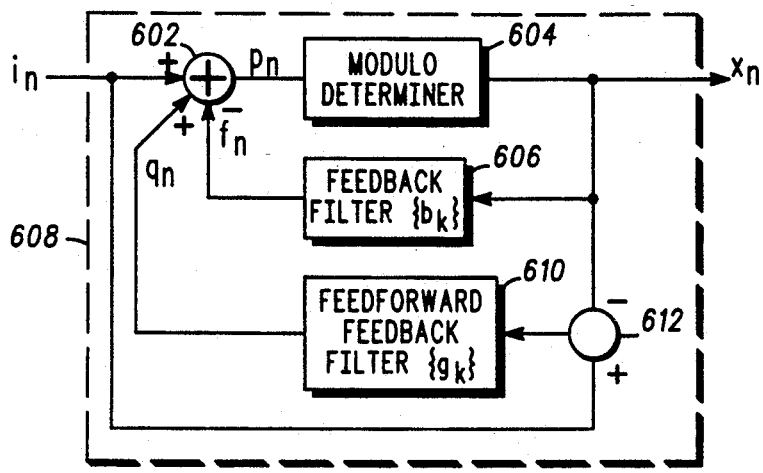
FIG. 6 illustrates an exemplary embodiment of a Tomlinson precoding unit of a device with precoding in accordance with the present invention.
Figure 7:
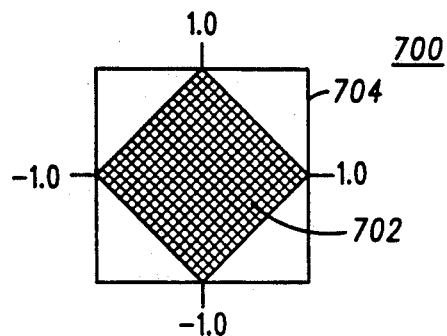
FIG. 7 is a schematic representation of a 45° rotated square region (shaded) for a modulo determiner that reduces precoded symbols in accordance with the present invention.

FIG. 6, numeral 600, illustrates an exemplary embodiment of a Tomlinson precoding unit (608) of a device with precoding in accordance with the present invention. Again, the transmitted sequence, x(D), is substantially:

$$x(D)=i(D)-x(D)[b(D)-1]+[i(D)-x(D)][g(D)-1]-c(D),$$

where
x(D)[b(D)−1] corresponds to a feedback term and [i(D)−x(D)][g(D)−1)] corresponds to a new "modified coupled feedforward feedback" term since it involves foth feedforward symbol i(D) and the feedback symbol x(D) in the filtering process g(D)−1. b(D) is typically of a form $1+b_1D+b_2D^2+\ldots+b_{K1}D^{K1}$ and g(D) is typically of a form $1+g_1D+g_2D^2+\ldots+b_{K2}D^{K2}$, where K1 is a highest order of coefficients for the feedback filter (606) and K2 is a highest order of coefficients for the feedforward/feedback filter (610). Previously encoded symbols $x_{n-k}$, k=1, 2, 3, ...,K, are passed through a feedback filter (606) providing a feedback signal $f_n = \Sigma x_{n-k} b_k$, where $b_k$ corresponds to the $$1 \leq k \leq K1$$

coefficients of the D-transform b(D), typically with $b_0$ normalized to unity without loss of generality. When g(D)≠1, then a feedforward/feedback term of substantially a form $q_n = \Sigma[i_{n-k} - x_{n-k}]g_k$ is required, with $g_k$ corresponding $$1 \leq k \leq K2$$

to the coefficients of the D-transform g(D), again typically with $g_0$ normalized to unity without loss of generality. The precoder combiner (602) subtracts $f_n$ and adds $q_n$ to $i_n$ to form $p_n = i_n - f_n + q_n$. In the case of Tomlinson precoding the modulo determiner (604) provides at its output $x_n = p_n - c_n$ where $c_n$ is a symbol from lattice $RZ^2$ that is closes (in Euclidean distance) to $p_n$, and so forth. In the case of trellis precoding, a Viterbi algorithm is typically utilized. A precoder combiner (602), typically an adder, subtracts the feedback signal $f_n$ from the input symbol $i_n$ and adds the signal $q_n$ to form $p_n = i_n - f_n + q_n$. A modulo determiner (604) provides encoded symbols relative to a 2D lattice $\Lambda = RZ^2$ configured such that, for a $p_n$ input to the modulo determiner (604), an output is substantially $x_n = i_n - f_n + q_n - c_n = p_n - c_n$, where $c_n$ is a symbol from $\Lambda = RZ^2$ that is closest (in Euclidean distance) to $p_n$, minimizing an instantaneous energy $|x_n|^2$ of the precoded symbol without delay. A feedforward feedback filter (610) is utilized where g(D)≠1, the previously encoded symbols $x_{n-k}$ being fed back into the g(D)−1 block as further described for FIG. 2A. a second combiner (612) is utilized to subtract modulo determiner (604) output from input $i_n$ and provide input to the feedforward feedback filter (610). The modulo determiner (604) substantially reduces precoded symbols to a 45° rotated square region (shaded)(702), illustrated in FIG. 7, numeral 700, (where a larger square (704) is a boundary in the case of shaping) to reduce signal peaks, wherein a normalized average energy of the precoded symbol has substantially the same energy as that of a 128-point quadrature amplitude modulated (QAM) signal constellation with a square boundary (702). Trellis coding is a method of increasing distances between symbols of a signal constellation such that symbols likely to be confused are separated by maximized distances, while substantially not increasing average power. Shaping, a method of reducing the energy of coded symbols, may be utilized to provide shaping gain such that more noise can be handled with a same transmit power.

Figure 8A:
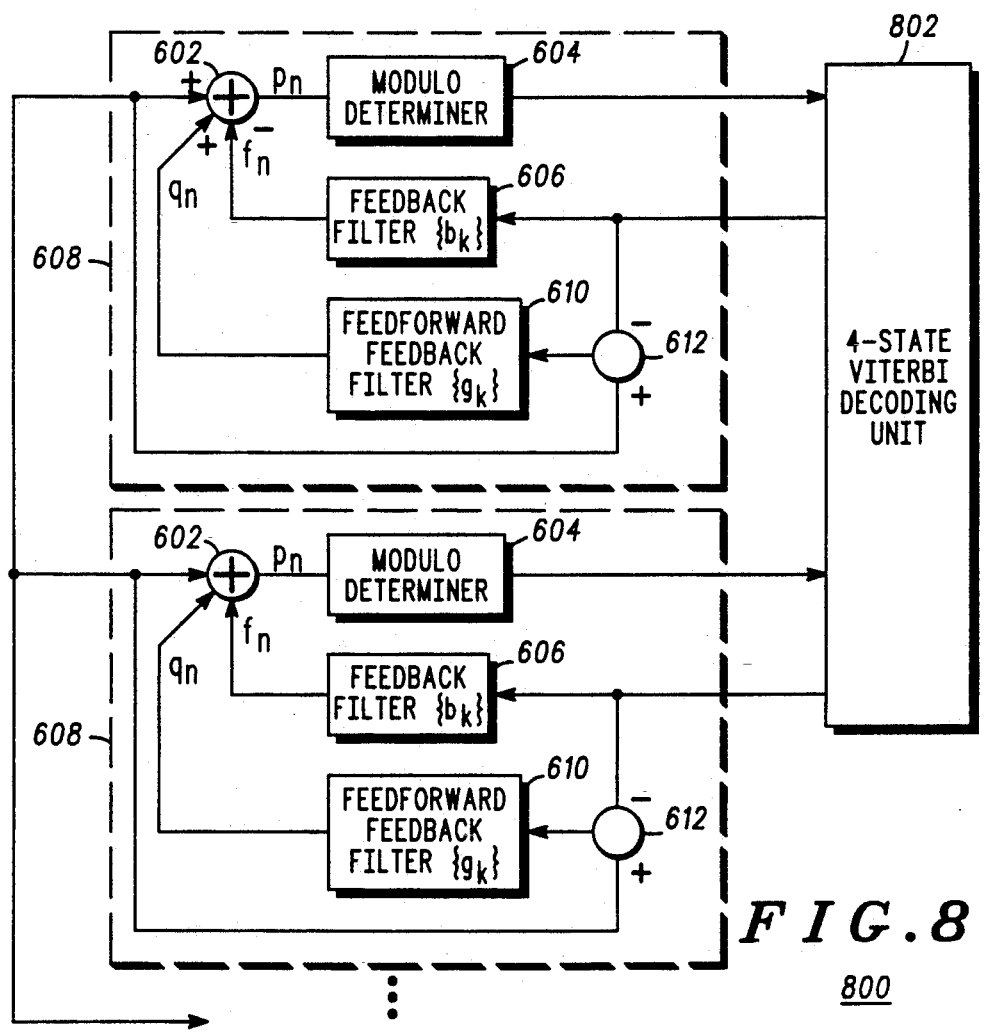
FIG. 8A illustrates an exemplary embodiment of a trellis decoding unit of a device with precoding in accordance with the present invention.
Figure 8B:
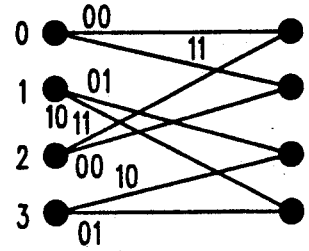
FIG. 8B is a schematic representation of an exemplary trellis code T diagram showing all sequences whose subset labels $\{b_n\}$ belong to a 4-state rate-$\frac{1}{2}$ convolutional code C.

FIG. 8A, numeral 800, illustrates an exemplary embodiment of a trellis precoding unit in accordance with the present invention. The trellis precoding unit is configured to utilize a modulo determiner(604) on a sequence basis with respect to a trellis code T to determine $x_n = p_n - c_n$, $c_n$ being a sequence in C such that the precoded symbols $x_n$ have a small average energy. (Obtaining the sequence $c_n$ necessarily invokes some delay.) For example, about 0.7-0.9 decibels of shaping gain may be obtained with a simple 4-state 2D Ungerboeck code. Shaping gain depends on the response of the feedback (prediction) filter h(D), but only slightly. Required delay in this example is 6-10 symbols. The symbols of the trellis code T lie on an integer lattice $Z^2$, the symbols belonging to one of 4 subsets that are represented by a two bit subset label $b_n$. The exemplary trellis code T consists of all sequences whose subset labels $\{b_n\}$ belong to a 4-state rate-½ convolutional code C whose trellis diagram is set forth in FIG. 8B, numeral 850.

In trellis precoding the modulo determination is implemented using a Viterbi algorithm (VA), for example in a 4-state Viterbi decoding unit (802), wherein inputs to the VA are encoded symbols, and outputs are precoded symbols $x_{n-D}$. The VA searches for a code sequence $\{c_n\}$ from C such that an average energy of $x_n = p_n - c_n$ is minimized. At any given time, the VA has in storage four path histories (candidate paths) $\{x_k(i)\}$, i=0,1,2,3, with k<n, where each path is associated with a different state of the convolutional code. The VA also has in storage, as path metrics, a total energy (E) of each path, accumulated up to time n:

$$E(i) = \sum_{k<n} |x_k(i)|^2.$$

When a new encoded symbol $i_n$ arrives, the VA extends each candidate path into two possible directions according to the trellis diagram being implemented (the trellis diagram set forth above for the exemplary embodiment) and increments each path metric.

Specifically, for a branch (i−>j) from state i to state j, a path metric is incremented according to:

$$E(i->j) = E(i) + |i_n = \sum_{1 \leq k \leq K1} x_{n-k(i)} b_k +$$

$$\sum_{1 \leq k \leq K2} [i_{n-k(i)} - x_{n-k(i)}]g_k - c_{n(i->j)}|^2$$

where $x_{n-k}(i)$ denotes the transmit symbol, $i_{n-k}(i)$ denotes the initial symbol, and $c_n(i->j)$ is a symbol in a subset associated with a branch (i−>j) that minimizes a value of E(i−>j), the VA retaining only a path that has a smallest path metric, and updating path history accordingly. For example, if for new state j the path that comes from old state i has a smallest metric, then the new path history of state j will be the old path history of state i, with a new symbol $$|i_n = \sum_{1 \leq k \leq K1} x_{n-k(i)} b_k +$$

$$\sum_{1 \leq k \leq K2} [i_{n-k(i)} - x_{n-k(i)}]g_k - c_{n(i->j)}|$$

appended.

After completion of the above steps, the VA determines a state j that has a smallest total energy and releases an oldest symbol $x_{n-Y}(j)$ from its path history as a precoded symbol, where Y is delay. To ensure that an ultimately selected sequence $\{c_n\}$ is a legitimate sequence from trellis code T, the VA assigns very large path metrics to all paths that are not a continuation of the most recently released symbol.

As illustrated in FIG. 8A, numeral 800, in the exemplary embodiment, a trellis precoding unit utilizing the VA (802) effectively has one Tomlinson precoder (804, 806, 808; 810, 812, 814; 816,818,820; 822,824,826) for each state of the trellis code that work in parallel, each using feedback from its own path history. Where the delay in the VA of the 4 state Viterbi decoding unit (828) is zero, the trellis precoding unit has a complexity and performance of a Tomlinson precoding unit, operating on a symbol by symbol basis yielding precoded symbols within a square boundary of side square root of two and with essentially a uniform probability density so that for every baud only one precoding filter is necessary. Where the delay is non-zero, shaping gain is obtained, and precoded symbols will have a square boundary of length two and a probability density resembling a truncated Gaussian density.

The precoded, shaped symbols are typically passed through a transmission preparation unit (106), where desired, typically simply a pulse-shaping filter unit appended to a digital-to-analog converter unit and an analog filter unit, operably connected to the precoding unit, configured to generate shaped signal samples. The present invention may be implemented without utilizing a transmission preparation unit in selected applications.

The receiver typically includes at least a linear equalizer and a symbol-rate processing unit (103). Output $r_n$ of the receiver filtering unit typically has a form:

$$r_n = i_n - c_n + w_n = s_n - (t_n,0,0) - c_n + w_n = y_n + w_n$$

where $w_n$ is a distortion sequence, $c_n$ is a code sequence from a shaping trellis code, and $y_n = s_n - (t_n,0,0) - c_n$ is substantially a noise-free desired signal and is a valid code sequence from the Wei code. Thus, the decoding unit operates as usual to find an estimate $y_n'$.

Figure 9:
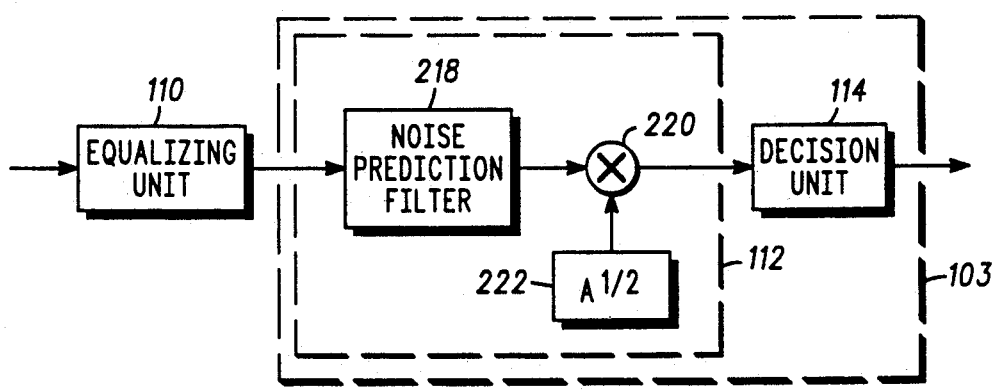
FIG. 9 illustrates an embodiment of a device with a symbol-rate processing unit with trellis precoding in accordance with the present invention.

FIG. 9 illustrates an embodiment of a receiver of a device with precoding in accordance with the present invention. The receiver typically includes at least: an equalizing unit (110) and a symbol-rate processing unit (103). The symbol-rate processing unit (103) typically includes: a noise prediction unit (112) and a decision unit (114). The noise prediction unit (112) typically operates at the symbol-rate. The decision unit (114) typically includes at least: a receiver Viterbi decoding unit (VA)(not shown), operably coupled to the equalizing unit (112), for decoding received equalized signals; an information shaping bit determiner (not shown), operably coupled to the Viterbi decoding unit, for determining an estimated information shaping bit sequence; a binary decoding unit (not shown), operably coupled to the receiver Viterbi decoding unit, for substantially determining an estimated information data input symbol sequence for received information symbols; and an information determiner (not shown), operably coupled to the information shaping bit determiner and to the binary decoding unit, for substantially determining estimated desired, substantially distortion free, information data. The information shaping bit determiner substantially determines an information shaping bit sequence of a received signal. Where desired, a syndrome former unit (not shown) operably coupled to the information shaping bit determiner is utilized for providing an estimated information shaping bit sequence. The estimated desired, substantially distortion free, information signal is substantially determined in the information determiner from the estimated information shaping bit sequence $\{i_n\}$ and estimated input symbol sequence sequence $\{s_n\}$. The syndrome former unit (1101) is more fully described below, with reference to FIG. 11. The noise prediction unit (112) typically comprises at least one noise filter unit (1206), as described more fully below with reference to FIG. 12.

The receiver Viterbi decoding unit (902) typically 'folds' a signal $r_n$ into a square boundary of a signal constellation to form $r_n'$, decodes the folded point utilizing the VA, and operates to determine, with a predetermined decoding delay, a most likely symbol $y_n'$ from the signal constellation.

Figure 10:
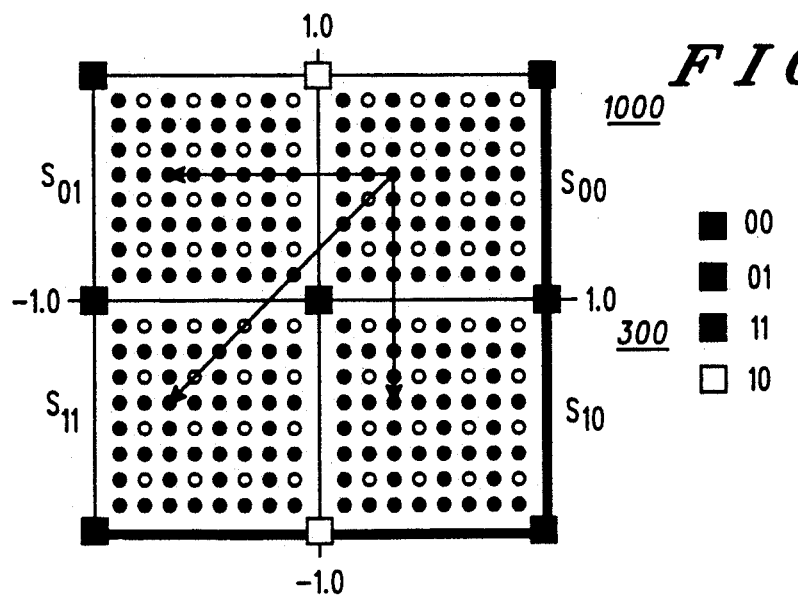
FIG. 10 is an exemplary representation of a 256 point signal constellation S' that consists of four-64 bit constellations $S_{00}$, $S_{01}$, $S_{10}$, and $S_{11}$, utilized in an embodiment of the present invention.

For example, where the signal constellation is a 256 point signal constellation S', FIG. 10, numeral 1000, $r_n$ is 'folded' into the square boundary of S' by reducing its coordinates to an interval $[-1.0,1.0]$ modulo 2 to obtain a folded point, and is decoded according to the VA to obtain $y_n'$ from S'. As shown in the exemplary signal constellation in FIG. 10, where S' is partitioned into four 64-point subconstellations, $S_{00}$, $S_{01}$, $S_{11}$ and $S_{10}$, in quadrants 1 through 4, respectively, each subconstellation is labelled by two shaping bits. Shaping affects only a shaping bit of the encoded symbol in two's complement representation.

For example, where the symbol is correctly estimated, $s_n$ is recovered by folding $y_n'$ into $S_{00}$ by extracting the information shaping bits from the output of the receiver Viterbi decoding unit (902). To recover the information shaping bits $i_n$, the extracted information shaping bits $z_n'$ of the estimate $y_n'$ are passed through the syndrome former (910), where desired (typically where a precoder introduced shaping gain), to the information determiner (912) that substantially determines the estimated desired, substantially distortion free, information signal from the estimated information shaping bit sequence $\{i_n\}$ and the estimated input symbol sequence sequence $\{s_n\}$.

Figure 11:
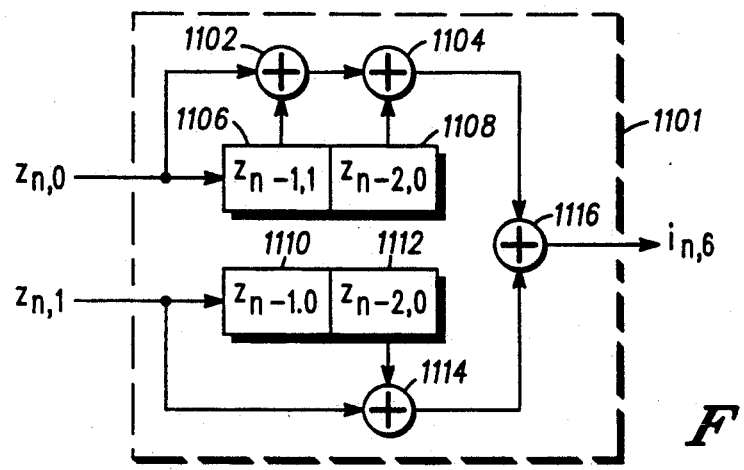
FIG. 11 illustrates an exemplary embodiment of a syndrome former unit of a device with trellis precoding in accordance with the present invention.

FIG. 11 illustrates an exemplary embodiment of a syndrome former unit (1101) of a device with precoding in accordance with the present invention. Defining $z_n = [z_{n,0}, z_{n,1}]$ as a two-bit label of a subconstellation where an estimated single point lies, it is clear that $z_n = t_n \oplus b_n$, where $\{b_n\}$ is a sequence from the convolution code C and $t_n = (t_{n,0}, 0)$ for an inverse syndrome former output $t_{n,0}$. A primary first delay unit is operably connected to the information shaping bit determiner (914) output having a primary bit label output, $z_{n,0}$, and to a primary second delay unit (1108). A third summer (1102), operably coupled to the information shaping bit determiner output (914) having the primary bit label output and to the primary first delay unit (1106), sums the received $z_{n,0}$ and a first delayed $z_{n-1,0}$ to provide a first sum. A fourth summer (1104), operably coupled to the third summer (1102) and to the primary second delay unit (1108), sums the first sum and a second delayed $z_{n-1,0}$ to provide a second sum. A secondary first delay unit is operably coupled to the information shaping bit determiner (914) output having a secondary bit label output, $z_{n,1}$, and to a secondary second delay unit (1112). A fifth summer (1114), operably coupled to the information shaping bit determiner output having the secondary bit label output and to the secondary second delay unit (1112) sums the received $z_{n-1,1}$ and a second delayed $z_{n-2,1}$ to provide a third sum. A sixth summer (1116), operably coupled to the fourth summer (1104) and to the fifth summer (1114), sums the second sum and the third sum to provide an estimated information shaping bit sequence, $i_n$. In a preferred embodiment summer operations are typically exclusive OR operations.

In another embodiment at least one of: the precoding unit; the spectral shaping unit; the transmission preparation unit; the equalizing unit; and the symbol-rate processing unit; may be implemented utilizing a computer program storage medium having a computer program to be executed by a digital computer stored thereon, the computer program comprising at least one of:

first unit for converting information into a selected number of bits to provide coded symbols and the information shaping bit inserting unit at least provides modified, where desired, information shaping bit(s);

second unit for utilizing the modified, encoded symbols to generate precoded, modified, encoded symbols, termed a first symbol;

third unit for substantially spectrally shaping the first symbol to obtain substantially a shaped symbol and for transmitting the shaped symbol, where desired;

fourth unit for receiving information symbols, for at least utilizing an equalizing unit to generate filtered, received information symbols;

fifth unit for utilizing a symbol-rate processing unit to obtain selectably filtered, received noise predicted information symbols;

eighth unit for determining substantially the estimated information data input symbol sequence for the received information symbols; and a ninth unit for at least one of:
obtaining information shaping bits of the information input sequence; and
substantially obtaining estimated information shaping bits of information input.

In another embodiment at least one of: the precoding unit; the spectral shaping unit; the transmission preparation unit; the equalizing unit; and the symbol-rate processing unit; may be implemented utilizing at least a first digital signal processor configured to provide at least one of:

first unit for converting information into a selected number of bits to provide coded symbols and the information shaping bit inserting unit at least provides modified, where desired, information shaping bit(s);

second unit for utilizing the modified, encoded symbols to generate precoded, modified, encoded symbols, termed a first symbol;

third unit for substantially spectrally shaping the first symbol to obtain substantially a shaped symbol and for transmitting the shaped symbol, where desired;

fourth unit for receiving information symbols, for at least utilizing an equalizing unit to generate filtered, received information symbols;

fifth unit for utilizing a symbol-rate processing unit to obtain selectably filtered, received noise predicted information symbols;

eighth unit for determining substantially the estimated information data input symbol sequence for the received information symbols; and a ninth unit for at least one of:
obtaining information shaping bits of the information input sequence; and
substantially obtaining estimated information shaping bits of information input.

Figure 12:
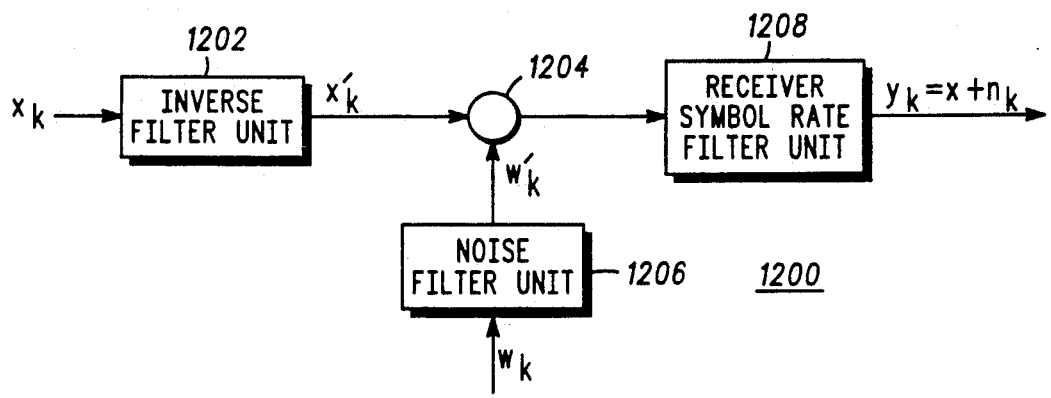
FIG. 12, illustrates a system model utilized for determination of an optimal spectral shaping function of the present invention.

FIG. 12, numeral 1200, sets forth a system model utilized to illustrate determination of an optimal spectral shaping function of the present invention, the spectral shaping function being utilized for transmission. Where input symbol sequence $\{x_k\}$ represents information to be transmitted, $\{w_k\}$ represents a symbol sequence for a white noise process, H(z) represents a transfer function of a receiver symbol rate filter unit (1208), $H^{-1}(z)$ represents an inverse of the transfer function H(z) of an inverse filter unit (1202), G(z) represents a transfer function of a noise filter unit (1206) of the noise prediction unit (112), and the noise filter unit output is summed (1204) with the inverse filter unit output, an output $\{y_k\}$ of the receiver symbol rate filter unit is composed of $\{x_k\}$, a symbol sequence, and $\{n_k\}$, a noise sequence. Clearly, the symbol sequence is not altered, and $\{\hat{x}_k\} = \{x_k\}$. H(z) is designed such that $E[n_k^2]$ is minimized, where, $S_{nn}$ being a noise-power spectrum, also known as a power spectral density, $$E = E[n_k^2] = \frac{1}{2\pi} \int_{-\pi}^{\pi} S_{nn}(e^{jw})|G(e^{jw})|^2 \ |H(e^{jw})|^2 \ dw,$$

and is subject to a constraint that limits power/energy:

$$\theta(e^{jw}) = \frac{1}{2\pi} \int_{-\pi}^{\pi} \frac{dw}{|H(e^{jw})|^2} - C = 0.$$

Applying a classical Lagrangian method, substantially minimizing $$V = \frac{1}{2\pi} \int_{-\pi}^{\pi} S_{nn}(e^{jw})|G(e^{jw})|^2 \ |H(e^{jw})|^2 + \frac{\lambda}{|H(e^{jw})|^2} \ dw,$$

$\frac{dV}{d\delta}$ is determined. One solution for $\frac{dV}{d\delta} = 0$ for $\delta = 0$ is $$S_{nn}(e^{jw})|G(e^{jw})|^2 = \frac{\lambda}{|H(e^{jw})|^4},$$

which yields $$|H(e^{jw})| = \frac{\lambda^{\frac{1}{4}}}{[S_{nn}(e^{jw})]^{\frac{1}{4}}} \ \frac{1}{(|G(e^{jw})|)^{\frac{1}{2}}}.$$

Thus, the optimal $|H(e^{jw})|$ to be utilized, $|H_{op}(e^{jw})|$, in the receiver assumes a spectral shape of a square root response of the inverse of a noise shape $|G(e^{jw})|$ scaled by a constant. Deriving $\lambda$ by imposing the above constraint, and supposing $S_{nn}(e^{jw})$, a noise prediction filter function, is a constant of $N_o/2$, for $$B = \frac{1}{2\pi} \int_{-\pi}^{\pi} |G(w)|dw \text{ and}$$

$$E_T = C = \frac{1}{2\pi} \int_{-\pi}^{\pi} \frac{dw}{|H_{op}(e^{jw})|^2},$$

then $\lambda = \frac{N_o}{2} \left(\frac{B}{E_T}\right)^2.$

Normalizing, $E_T = 1$, and $$|H_{op}(e^{jw})| = \frac{1}{(2\pi)^{\frac{1}{2}}} \frac{\int_{-\pi}^{\pi} |G(e^{jw})|dw}{[|G(e^{jw})|]^{\frac{1}{2}}}.$$

For practical application, most lines may be modelled by a single pole model of a form $A(z)=1/[1+A(z)^{-1}]$. Thus, utilizing A(z) for optimization and limiting B(z) to a first order form of $1+b_1z^{-1}$, it is clear that optimal $b_{op}(z)$ depends only on the magnitude of the noise pole g, and an optimal noise prediction pole, $b_{op}$, is substantially:

$$b_{op} = \left[ \frac{1 - \sqrt{1 - r^2}}{r^2} \right] g,$$

where r denotes a magnitude of g.

This solution retains a same angular orientation as the unconstrained solution. Thus, for a first order prediction model, the noise model is essentially unconstrained. Additionally, for first order systems, by training noise predictive coefficients first, then optimizing utilizing a magnitude of $$\frac{1 - \sqrt{1 - r^2}}{r^2}$$

as an optimal coefficient for a first order noise filter function, an optimal transmission spectral shaping is obtained. It is clear that an order of the noise prediction filtering function is selectable, for example, said function may be selected to be a second order function, substantially $b(D) = 1 + b_1 z^{-1} + b_2 z^{-2}$.

Figure 13:
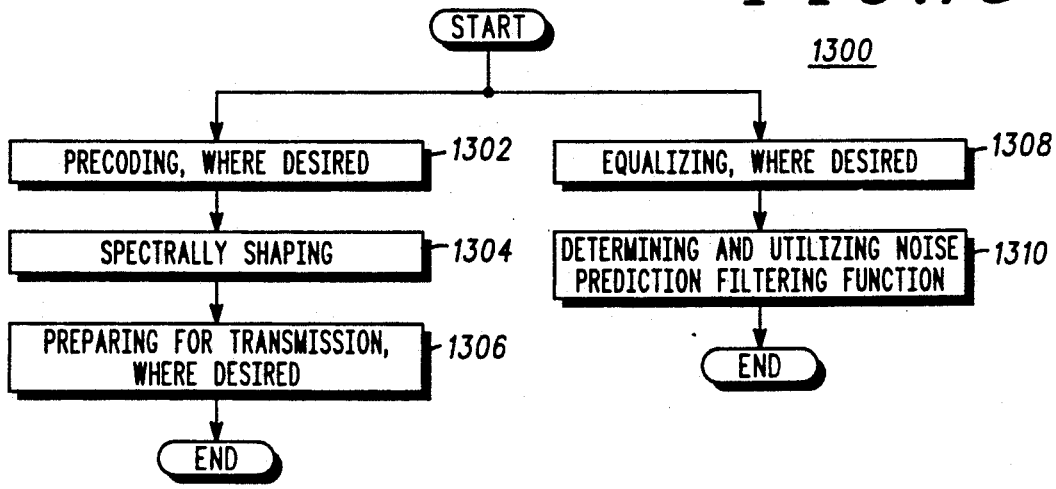
FIG. 13 is a flow diagram of steps of a method in accordance with the present invention.

FIG. 13, numeral 1300, illustrates the steps of one embodiment of the method of the present invention, providing for a substantially precoded symbol-rate transmitter spectral shaping of signals representative of digital information, the digital information being represented by at least an initial symbol sequence, comprising at least one of the sets of steps of: (A) precoding, where desired, the at least initial symbol sequence utilizing a predetermined equivalent channel response (1302); utilizing a spectral shaping filtering function and a first scaling factor to provide a spectrally shaped sequence (1304); providing at least one of: preselected filtering and preselected equalization, to obtain a spectrally shaped transmission sequence for transmission, where desired (1306); and (B) utilizing an equalization unit (1308) and determining a noise prediction filtering function such that the noise prediction filtering function and a second scaling factor are utilized to provide at least a first symbol sequence for a symbol-rate spectrally shaped signal (1310).

As more particularly set forth above for the device of the present invention, selected embodiments may be utilized in the method of the invention: the predetermined equivalent channel response may be selected to be substantially a product of the noise prediction filtering function and the spectral shaping filtering function; the predetermined equivalent channel response may be selected to be substantially one and the spectral shaping filtering function to be substantially an inverse of the noise prediction filtering function; the noise prediction filtering function may be further selected to be a first order function, substantially $b(D) = 1 + b_1 z^{-1}$; the noise prediction filtering function may be further selected to be a second order function, substantially $b(D) = 1 + b_1 z^{-1} + b_2 z^{-2}$; the predetermined equivalent channel response may be selected to be substantially equivalent to the noise prediction filtering function and the spectral shaping filtering function to be substantially one; and the predetermined equivalent channel response may be selected to be substantially a product of the spectral shaping filtering function and the noise prediction filtering function and the spectral shaping filtering function to be a selected shaping response.

Although exemplary embodiments of the device and method of the present invention are set forth above, it will be obvious to those skilled in the art that many alterations an modifications may be made without departing from the invention. Accordingly, it is intended that all such alterations and modifications be included within the spirit and scope of the invention as defined in the appended claims.

Clearly, the present invention may be utilized in data communication equipment, particularly modems, to provide a variety of operational modes relative to equalization method and transmitter spectral shaping desired, ranging from generalized (also trellis) precoding with and without spectral shaping to optimal linear equalization and suboptimal linear equalization with spectral shaping.

We claim:

1. A device for providing symbol-rate transmit spectral shaping of a digital information sequence in a digital transmission system, comprising at least one of:
   modulation means for at least modulating the digital information sequence; and
   demodulation means for at least demodulating the modulated digital information sequence to provide an estimate of the digital information sequence;
   wherein:
   the modulation means comprises at least:
       a precoding means operably coupled to receive the digital information sequence, for precoding said sequence utilizing a predetermined monic equivalent channel response h(D) to generate a precoded sequence;
       a symbol-rate spectral shaping means with a monic filter response $a(D) \neq 1$, operably coupled to the precoding means, for utilizing a spectral shaping filtering function and a first scaling factor to provide a spectrally shaped sequence of precoded symbols; and
       a transmission preparation means operably coupled to the symbol-rate spectral shaping means, for generating a spectrally-shaped transmission sequence for transmission on a selected channel;
   and the demodulation means comprises at least:
       an equalizing means operably coupled to receive the spectrally-shaped transmission sequence, for providing an equalized spectrally-shaped sequence of precoded symbols; and
       a symbol-rate processing means, operably coupled to the equalizing means, comprising:
           noise prediction means, operably coupled to receive the equalized spectrally-shaped sequence of precoded symbols, for substantially utilizing a symbol-rate noise prediction filter with response $b(D) = h(D)/a(D)$ and at least a second scaling factor to provide a noise prediction filter output; and
           decoding means, operably coupled to the symbol-rate noise prediction means, for providing an estimate of the digital information sequence.

2. The device of claim 1, wherein the predetermined equivalent channel response h(D) is a product of the noise prediction filter with response b(D) and the spectral shaping filter a(D).

3. The device of claim 2, wherein the noise prediction filtering function is a second order filter function of a form $b(D) = 1 + b_1 D + b_2 D^2$ wherein $b_1$ and $b_2$ are selected coefficients.

4. The device of claim 1, wherein the noise prediction filter with response b(D) is a first order filter of a form $b(D) = 1 + b_1 z^{-1}$ having a noise prediction coefficient $b_1$ that is substantially equal to $$\left( \frac{1 - \sqrt{1 - r^2}}{r^2} \right) g,$$

where g is a noise pole and r denotes a magnitude of g.

5. The device of claim 1, wherein the predetermined equivalent channel response h(D) is substantially one, and the spectral shaping filter with response a(D) is substantially an inverse of the noise prediction filter with response b(D).

6. The device of claim 1 wherein the equalizing means comprises substantially a linear equalizer.

7. The device of claim 1 wherein the first scaling factor is substantially equal to $1/\sqrt{A}$ wherein A is the sum of the squares of the coefficients of a(D) and the second scaling factor is substantially equal to $\sqrt{A}$.

8. A device in a modem for providing symbol-rate transmit spectral shaping of a digital information sequence in a digital transmission system, comprising at least:
   modulation means for at least modulating the digital information sequence; and
   demodulation means for at least demodulating the modulated digital information sequence to provide an estimate of the digital information sequence;
   wherein:
   the modulation means comprises at least:
      a precoding means operably coupled to receive the digital information sequence for precoding said sequence utilizing a predetermined monic equivalent channel response h(D) to generate a precoded sequence;
      a symbol-rate spectral shaping means with a monic filter response a(D)≠1, operably coupled to and responsive to the precoding means, for utilizing a spectral shaping filtering function and a first scaling factor to provide a spectrally shaped sequence of precoded symbols; and
      a transmission preparation means operably coupled to and responsive to the symbol-rate spectral shaping means, for generating a spectrally-shaped transmission sequence for transmission on a selected channel;
   and the demodulation means comprises at least;
      an equalizing means operably coupled to receive the spectrally-shaped transmission sequence, being responsive to the transmission preparation means, for providing an equalized spectrally-shaped sequence of precoded symbols; and
      a symbol-rate processing means, operably coupled to and responsive to the equalizing means, comprising:
         noise prediction means, responsive to the equalizing means, being operably coupled to receive the equalized spectrally-shaped sequence of precoded symbols for substantially utilizing a symbol-rate noise prediction filter with response b(D)=h(D)/a(D) and at least a second scaling factor to provide a noise prediction filter output; and
         decoding means, operably coupled to and responsive to the symbol-rate noise prediction means, for providing an estimate of the digital information sequence.

9. The device of claim 8, wherein the predetermined equivalent channel response h(D) is substantially a product of the noise prediction filter with response b(D) and the spectral shaping filter with response a(D).

10. The device of claim 9, wherein the noise prediction filtering function is a second order filter function, substantially a transfer function of a form $b(D) = 1 + b_1 D + b_2 D^2$ wherein $b_1$ and $b_2$ are selected coefficients.

11. The device of claim 8, wherein the noise prediction filter with response b(D) is a first order filter with a response of a form $b(D) = 1 + b_1 D$ and having a noise prediction coefficient $b_1$ that is substantially equal to $$\left( \frac{1 - \sqrt{1 - r^2}}{r^2} \right) g,$$

where g is a noise pole and r denotes a magnitude of g.

12. The device of claim 8, wherein the predetermined equivalent channel response h(D) is substantially one, and the spectral shaping filter with response a(D) is substantially an inverse of the noise prediction filter with response b(D).

13. The device of claim 8 wherein the equalizing means comprises substantially a linear equalizer.

14. The device of claim 8 wherein the first scaling factor is substantially equal to $1/\sqrt{A}$ wherein A is the sum of the squares of the coefficients of a(D) and the second scaling factor is substantially equal to $\sqrt{A}$.

15. The device of claim 8, wherein the predetermined equivalent channel response h(D) is substantially one, and the spectral shaping filter with response a(D) is substantially an inverse of the noise prediction filter with response b(D).

16. The device of claim 8, wherein at least part of one of:
   the precoding means;
   the spectral shaping means;
   the transmission preparation means;
   the equalizing means; and
   the symbol-rate processing means,
   is implemented utilizing a computer program storage medium having a computer program to be executed by a digital computer stored thereon, the computer program comprising at least one of:
   first unit for converting information into a selected number of bits to provide encoded symbols;
   second unit for utilizing the encoded symbols to generate precoded, encoded symbols, termed a first symbol;
   third unit for substantially spectrally shaping the first symbol to obtain substantially a shaped symbol and for transmitting the shaped symbol, where desired;
   fourth unit for receiving information symbols, for at least utilizing an equalizing unit to generate equalized filtered, received information symbols;
   fifth unit for utilizing a symbol-rate processing unit to obtain selectably filtered, received noise predicted information symbols;
   sixth unit for determining substantially the estimated information data input symbol sequence for the received information symbols; and a
   seventh unit for substantially obtaining estimated information bits of information input.

17. The device of claim 8 wherein at least part of one of:

the precoding means;
the spectral shaping means;
the transmission preparation means;
the equalizing means; and
the symbol-rate processing means, is implemented utilizing at least a first digital signal processor configured to provide at least one of:

first unit for converting information into a selected number of bits to provide encoded symbols;

second unit for utilizing the encoded symbols to generate precoded, encoded symbols, termed a first symbol;

third unit for substantially spectrally shaping the first symbol to obtain substantially a shaped symbol and for transmitting the shaped symbol, where desired;

fourth unit for receiving information symbols, for at least utilizing an equalizing unit to generate equalized filtered, received information symbols;

fifth unit for utilizing a symbol-rate processing unit to obtain selectably filtered, received noise predicted information symbols;

sixth unit for determining substantially the estimated information data input symbol sequence for the received information symbols; and a seventh unit substantially obtaining estimated information bits of information input.

18. A method for providing symbol-rate transmit spectral shaping of a digital information sequence in a digital transmission system, comprising at least one of the sets of steps:

(A) precoding the digital information sequence utilizing a predetermined monic equivalent channel response $h(D)$ to generate a precoded sequence;

utilizing a symbol-rate spectral shaping filter with a monic filter response $a(D) \neq 1$, and a first scaling factor to provide a spectrally shaped sequence of precoded symbols;

generating a spectrally-shaped sequence for transmission on a selected channel; and (B) utilizing an equalization unit to provide an equalized spectrally-shaped sequence of said precoded symbols; and utilizing a symbol-rate noise prediction filter with response $b(D) = h(D)/a(D)$ and at least a second scaling factor to provide a noise prediction filter output, and providing an estimate of the digital information sequence.

19. The method of claim 18, wherein, in the step of precoding, the predetermined equivalent channel response $h(D)$ is a product of the noise prediction filter with response $b(D)$ and the spectral shaping filter with response $a(D)$.

20. The method of claim 19, wherein the noise prediction filtering function is a second order filter function of a form $b(D) = 1 + b_1 D + b_2 D^2$ wherein $b_1$ and $b_2$ are selected coefficients.

21. The method of claim 19, wherein the predetermined equivalent channel response $h(D)$ is substantially one, and the spectral shaping filter with response $a(D)$ is substantially an inverse of the noise prediction filter with response $b(D)$.

22. The method of claim 18, wherein the noise prediction filter with response $b(D)$ is a first order filter of a form $b(D) = 1 + b_1 z^{-1}$ having a noise prediction coefficient $b_1$ that is substantially equal to $$\left( \frac{1 - \sqrt{1 - r^2}}{r^2} \right) g,$$

where $g$ is a noise pole and $r$ denotes a magnitude of $g$.

* * * * *